United States Patent
Aoyagi et al.

(10) Patent No.: US 8,520,649 B2
(45) Date of Patent: Aug. 27, 2013

(54) MOBILE COMMUNICATION METHOD AND RADIO BASE STATION

(75) Inventors: Kenichiro Aoyagi, Yokosuka (JP);
Masafumi Masuda, Yokosuka (JP);
Yasuhiro Kawabe, Yokosuka (JP);
Takaaki Sato, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 258 days.

(21) Appl. No.: 12/993,614

(22) PCT Filed: May 20, 2009

(86) PCT No.: PCT/JP2009/059289
§ 371 (c)(1),
(2), (4) Date: Feb. 4, 2011

(87) PCT Pub. No.: WO2009/142247
PCT Pub. Date: Nov. 26, 2009

(65) Prior Publication Data
US 2011/0189996 A1    Aug. 4, 2011

(30) Foreign Application Priority Data
May 20, 2008    (JP) .................................. 2008-132513

(51) Int. Cl.
*H04W 4/00*    (2009.01)
*H04W 84/12*    (2009.01)

(52) U.S. Cl.
CPC ..................................... *H04W 84/12* (2013.01)
USPC .......................................... 370/338; 370/474

(58) Field of Classification Search
CPC ...................................................... H04W 84/12
USPC ................. 370/328–335, 338–341, 465–474
See application file for complete search history.

(56) References Cited

U.S. PATENT DOCUMENTS 5,920,553 A * 7/1999 Keskitalo et al. ............. 370/335
6,934,527 B1 * 8/2005 Hamada ......................... 455/405

(Continued)

FOREIGN PATENT DOCUMENTS

| CN | 1142295 A | 2/1997 |
| JP | 9 510057 | 10/1997 |

(Continued)

OTHER PUBLICATIONS

International Search Report issued Aug. 18, 2009 in PCT/JP09/059289 filed May 20, 2009.

(Continued)

*Primary Examiner* — Kan Yuen
(74) *Attorney, Agent, or Firm* — Oblon, Spivak, McClelland, Maier & Neustadt, L.L.P.

(57) ABSTRACT

A mobile communication method includes: a step which establishes a second radio access link between a mobile station and a radio communication data combining device for "an area limit service" via a radio base station for "a public area service" when a first radio access link is established between the mobile station and the radio communication data combining device for "the area limit service" via the radio base station for "the area limit service"; and a step in which the radio communication data combining device for "the area limit service" combines the data for "the area limit service" transferred from the radio base station for "the area limit service" and the data for "the area limit service" transferred from the radio base station for "the public area service."

4 Claims, 12 Drawing Sheets

(56) References Cited

U.S. PATENT DOCUMENTS

| | | | |
|---|---|---|---|
| 8,107,959 B2 * | 1/2012 | Kogure | 455/436 |
| 2003/0171118 A1 | 9/2003 | Miya | |
| 2006/0133318 A1 * | 6/2006 | Jung et al. | 370/331 |

FOREIGN PATENT DOCUMENTS

| | | |
|---|---|---|
| JP | 2000 69532 | 3/2000 |
| JP | 2003 124872 | 4/2003 |
| JP | 2005 348150 | 12/2005 |
| WO | 02 102109 | 12/2002 |
| WO | 2007 015068 | 2/2007 |

OTHER PUBLICATIONS

Office Action issued Nov. 13, 2012 in Japanese Patent Application No. 2010-513047 with English language translation.

Office Action issued Dec. 4, 2012, in Chinese Patent Application No. 200980118244.7 with English translation.

* cited by examiner

BACKGROUND ART FIG. 11

MOBILE COMMUNICATION METHOD AND RADIO BASE STATION

TECHNICAL FIELD

The present invention relates to a mobile communication method and a radio base station.

BACKGROUND ART

There has heretofore been known a mobile communication system configured to provide a communication coverage area divided into multiple cells and to allow a mobile station UE located in each cell to perform communication, as shown in FIG. 11.

In this mobile communication system, a radio communication data combining device establishes a communication path (an access link) for the mobile station UE via the cell selected based on communication quality information or the like on the cells reported from the mobile station UE.

A mobile communication system according to the W-CDMA mode, for example, achieves mobile communication with high communication quality in such a way that the mobile station UE is allowed to simultaneously establish three access links at a maximum, and that the radio communication data combining device combines data transmitted from the mobile station UE via the access links.

For example, in a general "public area service" such as voice communication, the mobile station UE may be located in any of the cells. Accordingly, the above-described radio communication data combining device is installed at a radio control device RNC and data combined by the radio communication data combining device are delivered to a correspondent device via a core network CN.

Meanwhile, a mobile communication system according to the IMT-2000 mode enables establishment of an internal communication area (a private area #1) which is established in a building or the like, and a home area (a private area #2) which is established at home or the like as shown in FIG. 12.

In such mobile communication system, by connecting radio communication data combining devices #c and #d respectively to LAN environments in the private areas #1 and #2, for example, as shown in FIG. 12, it is possible to provide a "local area restricted service" which enables large-volume data communication and the like in the private areas #1 and #2 without placing a heavy load on the public area.

Thus, in this mobile communication system, a user can utilize the "local area restricted service (a first service)" in the private areas #1 and #2, and utilize the ordinary "public area service (a second service)" in the public area with the single mobile station UE.

SUMMARY OF THE INVENTION

Problem to be Solved by the Invention

Here, in the conventional mobile communication system, a radio base station for the "public area service" is configured not to provide the "local area restricted service" to even the mobile station UE having an access right to the radio base station for the "local area restricted service."

However, when the private area #1 (the internal communication area) is established inside the public area as shown in FIG. 12, the communication quality of the "local area restricted service" at a boundary of the private area #1 such as at a window of a building may be significantly affected by the communication in the "public area service."

Hence, in this case, even in the private area #1 (the internal communication area), a mobile station UE has a problem of not being allowed to utilize the "local area restricted service" or of encountering deterioration in communication quality of the "local area restricted service" due to the effect of the communication in the "public area service."

Accordingly, the present invention has been made in view of the foregoing problem, and an objective thereof is to provide a mobile communication method and a radio base station which are capable of preventing deterioration in communication quality of a "local area restricted service (a first service)" by causing the radio base station for a "public area service (a second service)" to complement the "local area restricted service (the first service)."

Means for Solving the Problem

A mobile communication method of a first aspect includes the steps of: establishing a second radio access link between a first service radio communication data combining device and a mobile station via a second service radio base station, when a first radio access link is established between the first service radio communication data combining device and the mobile station via a first service radio base station; transferring first service data transmitted from the mobile station, from the first service radio base station to the first service radio communication data combining device via the first radio access link; transferring the first service data transmitted from the mobile station, from the second service radio base station to the first service radio communication data combining device via the second radio access link; and combining, at the first service radio communication, the first service data transferred from the first service radio base station and the first service data transferred from the second service radio base station.

In the first aspect, the mobile communication method may further include the step of: managing establishment permission information indicating whether or not to permit establishment of the second radio access link at the second service radio base station.

In the first aspect, the mobile communication method may further include the step of: notifying the mobile station of predetermined guidance information when the radio access link is established.

In the first aspect, the mobile communication method may further include the step of: generating charging information indicating establishment of the radio access link when the radio access link is established.

A radio base station of a second aspect configured to transmit and receive second service data, includes: a radio access link establishing unit configured to establish an access link with a first service radio communication data combining device and to establish a radio link with the mobile station, when a first radio access link is established between the first service radio communication data combining device and the mobile station via a first service radio base station; and a transferring unit configured to transfer first service data transmitted from the mobile station via the radio link, to the first service radio communication data combining device via the access link.

In the second aspect, the radio base station may further include: a managing unit configured to manage establishment permission information indicating whether or not to permit establishment of the radio link and the access link is managed by the radio base station.

In the second aspect, the radio base station may be configured to notify the mobile station of predetermined guidance information when the radio access link is established.

In the second aspect, the radio base station may be configured to generate charging information indicating establishment of the radio access link when the radio access link is established.

Effect of the Invention

As described above, according to the invention, provided is a mobile communication method and a radio base station which are capable of preventing deterioration in communication quality of a "local area restricted service (a first service)" by causing the radio base station for a "public area service (a second service)" to complement the "local area restricted service (the first service)."

EMBODIMENTS FOR CARRYING OUT THE INVENTION

Configuration of Mobile Communication System According to First Embodiment of the Present Invention A configuration of a mobile communication system according to a first embodiment of the present invention will be described with reference to FIG. 1 and FIG. 2.

Figure 1:
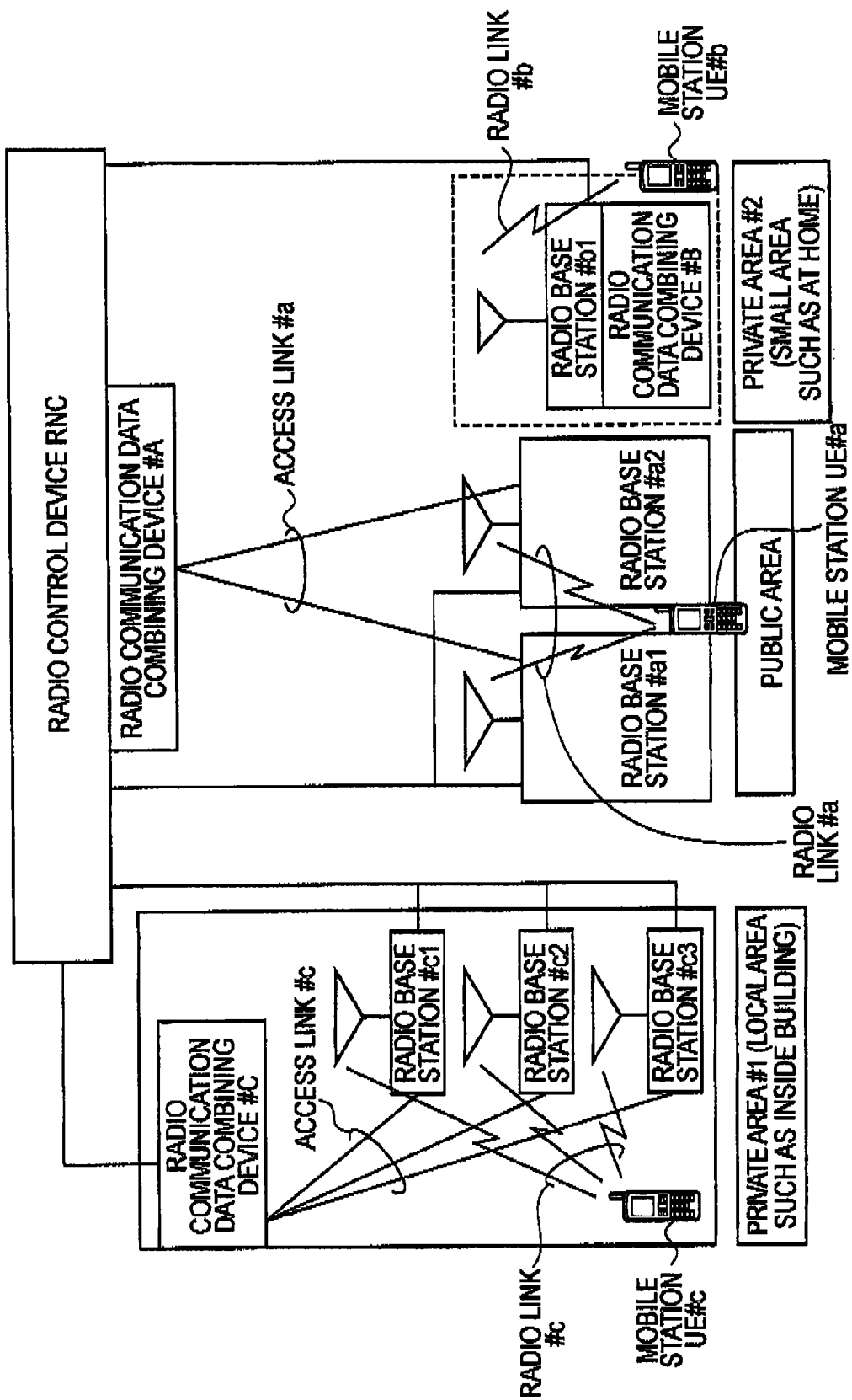
FIG. 1 is an overall configuration diagram of a mobile communication system according to a first embodiment of the present invention.

As shown in FIG. 1, a mobile communication system according to this embodiment includes a radio control device RNC, radio base stations #a1 and #a2, #b1, and #c1 to #c3, and radio communication data combining devices #A, #b, and #C as access network devices.

Here, each of the radio base stations #b1 and #c1 to #c3 is a small radio base station such as a Femto BTS or a HNB, which is installed for defining a private area.

Note that the radio base station #b1 and the radio communication data combining device #B are integrated together and capable of realizing cooperation with a home electric appliance or connection to a home LAN environment easily.

Meanwhile, in this embodiment, a "public area service" means a communication service (such as voice communication or data communication) provided in a public area by the radio base stations #a1 and #a2 for the "public area service," which are ordinary radio base stations installed by a common carrier.

On the other hand, a "local area restricted service" means a communication service (such as a flat-rate communication service) provided in a private area such as an area inside a building or an area at home by the radio base stations #b1 and #c1 to #c3 for the "local area restricted service," which are small radio base stations installed by a user, the communication service being used exclusively by the user.

The mobile communication system according to this embodiment is configured to establish a radio access link #a between the radio communication data combining device #A for the "public area service" and a mobile station UE#a via the radio base stations #a1 and #a2 for the "public area service" in order to provide the "public area service" in the public area.

Here, the radio access link #a (such as RRC connection) includes the radio access link #a established between the mobile station UE#a and the radio base stations #a1 and #a2, and an access link #a established between the radio base stations #a1 and #a2 and the radio communication data combining device #A for the "public area service."

Meanwhile, the mobile communication system according to this embodiment is configured to establish a radio access link #c (a first radio access link) between the radio communication data combining device #C for the "local area restricted service" and a mobile station UE#c via the radio base stations #c1 to #c3 for the "local area restricted service" in order to provide the "local area restricted service" in a private area #1.

Here, the radio access link #c (such as RRC connection) includes the radio access link #c established between the mobile station UE#c and the radio base stations #c1 to #c3, and an access link #c established between the radio base stations #c1 to #c3 and the radio communication data combining device #C for the "local area restricted service."

Meanwhile, the mobile communication system according to this embodiment is configured to establish a radio access link #b (a first radio access link) between the radio communication data combining device #B for the "local area restricted service" and a mobile station UE#b via the radio base station #b1 for the "local area restricted service" in order to provide the "local area restricted service" in a private area #2.

Here, the radio access link #b (such as RRC connection) includes the radio access link #b established between the mobile station UE#b and the radio base station #b1, and an access link #b established between the radio base station #b1 and the radio communication data combining device #B for the "local area restricted service."

Note that the radio base station #b1 for the "local area restricted service" is integrated with the radio communication data combining device #B for the "local area restricted service." Accordingly, the access link #b is the link located inside the device.

Note that, the mobile communication system according to this embodiment is configured to establish a second radio access link between the radio communication data combining device #C for the "local area restricted service" and the mobile station UE#c via the radio base stations #a1 and #a2 for the "public area service" when the radio access link #c is established in order to prevent deterioration in communication quality of the "local area restricted service in the private area #1.

In this case, the radio communication data combining device #C for the "local area restricted service" is configured to combine data for the "local area restricted service" transferred from the radio base stations #c1 to #c3 for the "local area restricted service" and data for the "local area restricted service" transferred from the radio base stations #a1 and #a2 for the "public area service."

Moreover, in this case, the radio communication data combining device #C for the "local area restricted service" is configured to separate the data for the "local area restricted service" transmitted from the core network CN and addressed to the mobile station UE#c and to cause the data to reach the mobile station UE#c via the radio base stations #c1 to #c3 for the "local area restricted service" and the radio base stations #a1 and #a2 for the "public area service."

Similarly, the mobile communication system according to this embodiment is configured to establish a second radio access link between the radio communication data combining device #B for the "local area restricted service" and a mobile station #b via the radio base stations #a1 and #a2 for the "public area service" when the radio access link #b is established in order to prevent deterioration in communication quality of the "local area restricted service" in a private area #2.

In this case, the radio communication data combining device #B for the "local area restricted service" is configured to combine data for the "local area restricted service" transferred from the radio base station #b1 for the "local area restricted service" and data for the "local area restricted service" transferred from the radio base stations #a1 and #a2 for the "public area service."

Moreover, in this case, the radio communication data combining device #B for the "local area restricted service" is configured to separate the data for the "local area restricted service" transmitted from the core network CN and addressed to the mobile station UE#b and to cause the data to reach the mobile station UE#b via the radio base station #b1 for the "local area restricted service" and the radio base stations #a1 and #a2 for the "public area service."

Figure 2:
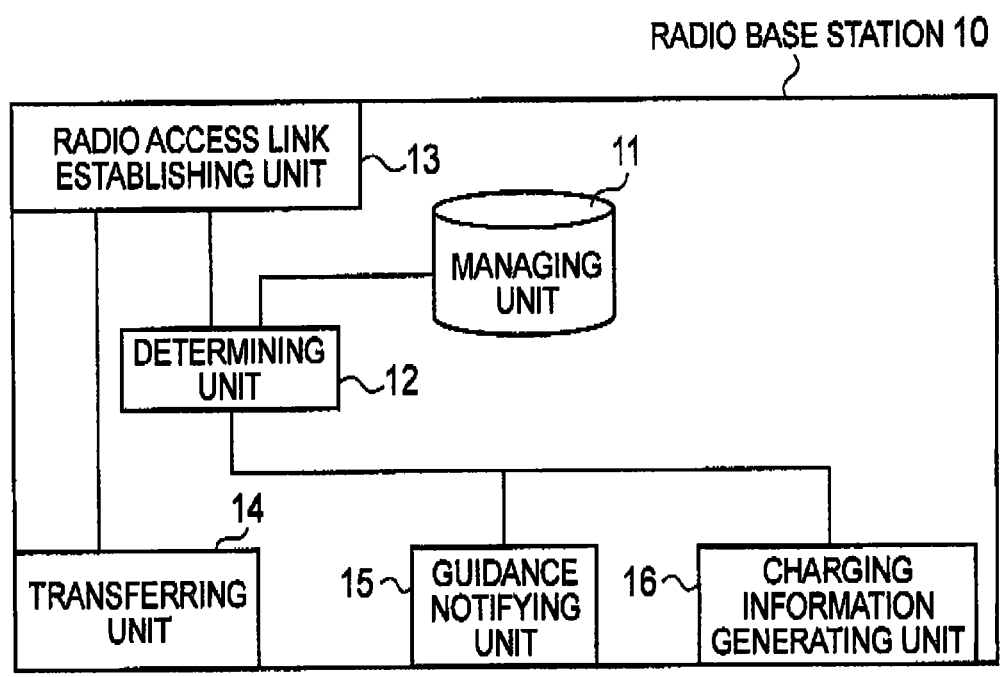
FIG. 2 is a functional block diagram of a radio base station according to the first embodiment of the present invention.

As shown in FIG. 2, a radio base station 10 (a "public area service" radio base station) configured to transmit and receive data for the "public area service" includes a managing unit 11, a determining unit 12, a radio access link establishing unit 13, a transferring unit 14, a guidance notifying unit 15, and a charging information generating unit 16.

The managing unit 11 is configured to manage a variety of setting information on the radio base station 10.

For example, the managing unit 11 is configured to manage establishment permission information indicating whether or not to permit the radio base station 10 to establish a radio link between the radio base station 10 and the mobile station UE as well as an access link between the radio base station 10 and the radio communication data combining device for the "local area restricted service," i.e., whether or not to permit the radio base station 10 to establish a radio access link between the radio communication data combining device for the "local area restricted service" and the mobile station UE.

Here, the establishment permission information may be designed to permit only a specific mobile station UE to establish of the radio access link with the radio communication data combining device for the "local area restricted serviced." Meanwhile, the establishment permission information may be formed of a certain identifier indicating whether or not to permit establishment of the above-described radio access link.

The determining unit 12 is configured to make reference to the establishment permission information managed by the managing unit 11 and to determine whether or not to establish the radio access link between the specific mobile station UE and the radio communication data combining device for the "local area restricted service."

Here, if the above-described establishment permission information is not managed by the managing unit 11, the determining unit 12 may determine to establish the radio access link between all the mobile stations UE and the radio communication data combining device for the "local area restricted service" or may determine not to establish the radio access link between all the mobile stations UE and the radio communication data combining device for the "local area restricted service."

The radio access link establishing unit 13 is configured to establish the radio access link between the mobile station UE and the radio communication data combining device for the "local area restricted service," i.e., a radio link (such as a radio transmission path) with the mobile station UE and an access link (such as a wired transmission path) with the radio communication data combining device for the "local area restricted service" in response to a determination result by the determining unit 12.

For example, the radio access link establishing unit 13 is configured to establish the radio access link between the mobile station UE and the radio communication data combining device for the "local area restricted service" in response to a request from the radio control device RNC (or the radio communication data combining device for the "local area restricted service").

The transferring unit 14 is configured to transfer the data for the "local area restricted service" transmitted from the mobile station UE via the above-described radio link to the radio communication data combining device for the "local area restricted service" via the above-described access link.

The guidance notifying unit 15 is configured to notify the mobile station UE of predetermined guidance information when the above-described radio access link is established by the radio access link establishing unit 13.

For example, the predetermined guidance information is voice guidance, character guidance or the like indicating that "it is likely to go out of the private area."

Here, the guidance notifying unit 15 may be configured to notify the mobile station UE of the predetermined guidance information in response to notification from the radio control device RNC (or the radio communication data combining device for the "local area restricted service").

The charging information generating unit 16 may be configured to generate charging information indicating establishment of the above-described radio access link when the link is established.

For example, even when the "local area restricted service" is a flat-rate communication service, it is possible to charge by using the charging information if the radio access link is established via the radio access link establishing unit 13 in the radio base station for the "public area service."

Here, the functions of the managing unit 11, the determining unit 12, the guidance notifying unit 15, and the charging information generating unit 16 may be included in the radio communication data combining device for the "local area restricted service" or the radio control device RNC instead of the radio base station for the "public area service."

Operations of Mobile Communication System
According to First Embodiment of the Present Invention Operations of the mobile communication system according to the first embodiment of the present invention will be described with reference to FIG. 3 to FIG. 8.

First of all, an operation to allow the radio base station #a1 for the "public area service" to complement the "local area restricted service" by the radio base station #c3 for the "local area restricted service" will be described with reference to FIG. 3 to FIG. 5.

Figure 3:
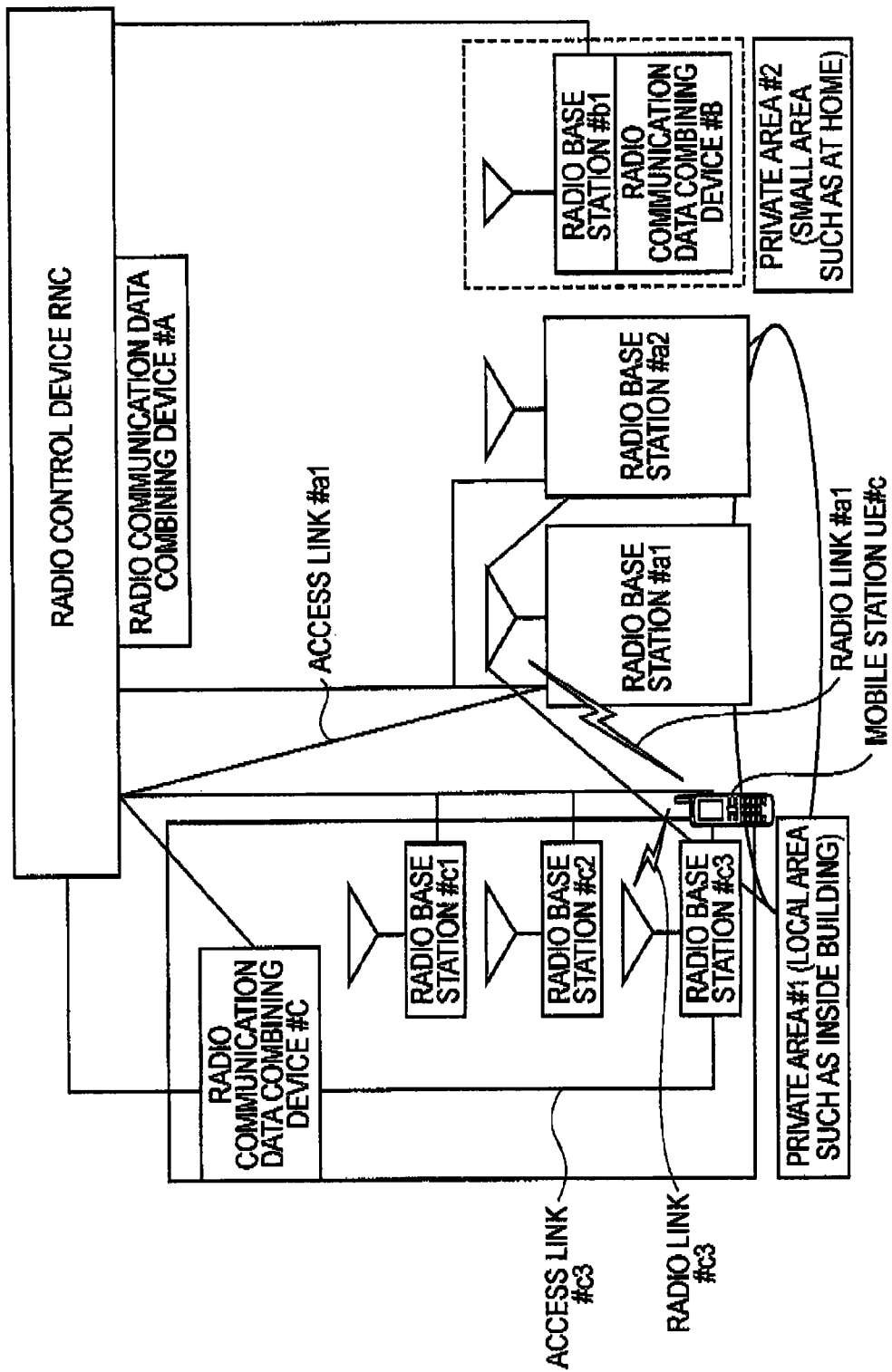
FIG. 3 is a view for explaining operations of the mobile communication system according to the first embodiment of the present invention.
Figure 4:
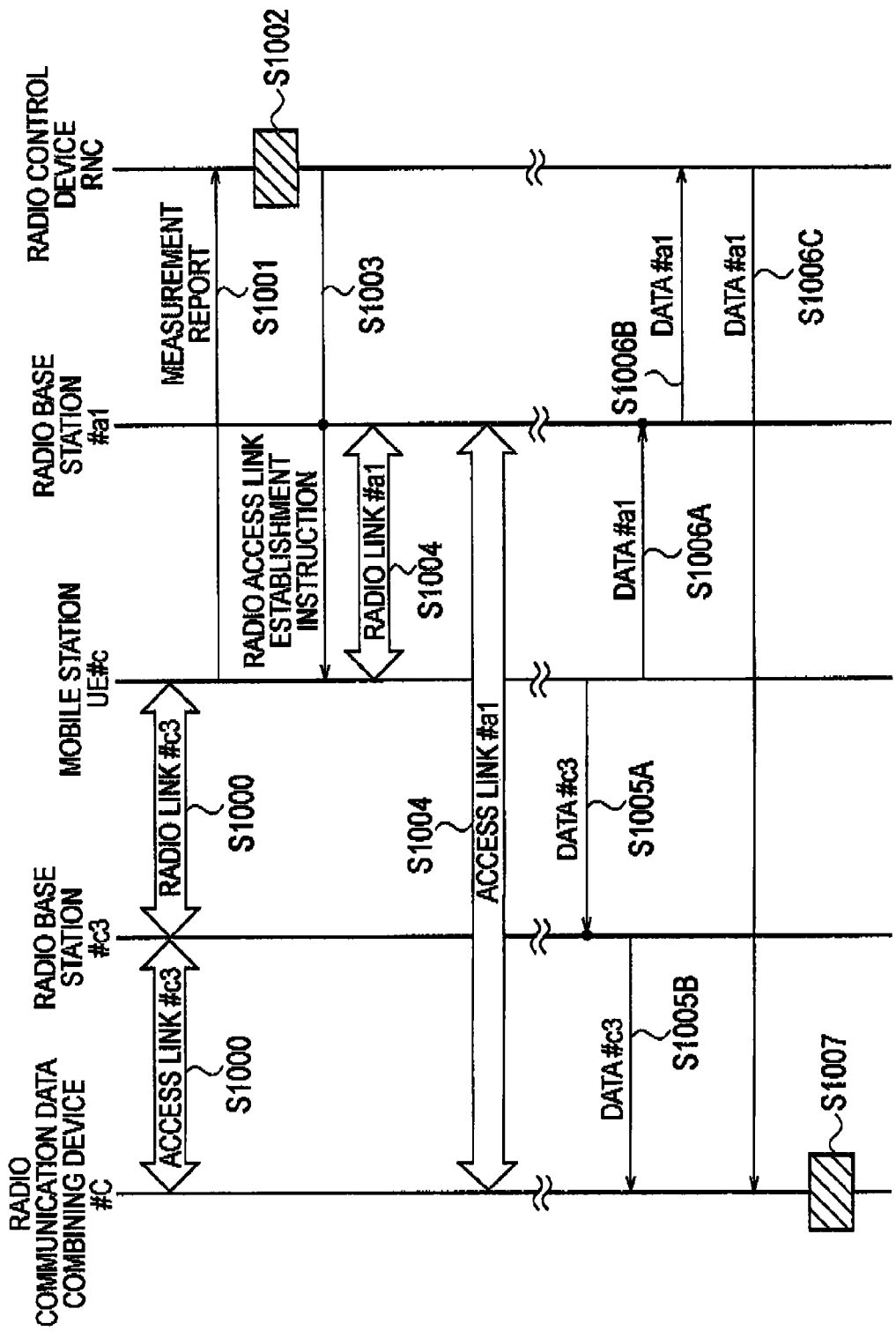
FIG. 4 is a sequence diagram showing the operations of the mobile communication system according to the first embodiment of the present invention.

As shown in FIG. 3 and FIG. 4, in step S1000, the radio link #c3 is assumed to be established between the mobile station UE#c and the radio base station #c3 for the "local area restricted service," the access link #c3 is assumed to be established between the radio base station #c3 for the "local area restricted service" and the radio communication data combining device #C for the "local area restricted service," and the radio access link #c3 is assumed to be established between the mobile station UE#c and the radio communication data combining device #C for the "local area restricted service."

In step S1001, the mobile station UE#c transmits a measurement report (Measurement Report) indicating communication quality of a neighboring cell to the radio control device RNC via the radio access link #c3.

In step S1002, in response to the received measurement report, the radio control device RNC determines whether or not the "local area restricted service" by the radio base station #c3 for the "local area restricted service" needs to be complemented by radio base station #a1 for the "public area service" (that is, whether or not the mobile station UE#c needs to perform a soft handover between the radio base station #a1 for the "public area service" and the radio base station #c3 for the "local area restricted service."

Here, upon a determination that it is necessary to complement, the radio control device RNC determines whether or not the "local area restricted service" by the radio base station #c3 for the "local area restricted service" can be complemented by the radio base station #a1 for the "public area service."

Upon a determination that it is possible to complement, the radio base station RNC transmits a radio access link establishment instruction to the radio base station #a1 for the "public area service" and the mobile station UE#c in step S1003.

Here, the radio control device RNC may transmit the radio access link establishment instruction to the radio base station #a1 for the "public area service" and the mobile station UE#c without determining whether or not the "local area restricted service" by the radio base station #c3 for the "local area restricted service" can be complemented by the radio base station #a1 for the "public area service."

In this case, the determination as to whether or not the "local area restricted service" by the radio base station #c3 for the "local area restricted service" can be complemented by the radio base station #a1 for the "public area service" is made by the radio base station #a1 for the "public area service."

In step S1004, the radio link #a1 is established between the mobile station UE#c and the radio base station #a1 for the "public area service," the access link #a1 is established between the radio base station #a1 for the "public area service" and the radio communication data combining device #C for the "local area restricted service," and the radio access link #a1 is established between the mobile station UE#c and the radio communication data combining device #C for the "local area restricted service."

Thereafter, data #c3 for the "local area restricted service" are transmitted from the mobile station UE#c to the radio communication data combining device #C for the "local area restricted service" via the radio base station #c3 for the "local area restricted service" in steps S1005A and S1005B, and data #a1 for the "local area restricted service" having the same contents as the data #c3 for the "local area restricted service" are transmitted from the mobile station UE#c to the radio communication data combining device #C for the "local area restricted service" via the radio base station #a1 for the "public area service" and the radio control device RNC in steps S1006A to S1006C.

In step S1007, the radio communication data combining device #C for the "local area restricted service" combines the received data #c3 for the "local area restricted service" and the data #a1 for the "local area restricted service" together, and transmits the combined data for the "local area restricted service" to the Internet or a correspondent terminal.

Figure 5:
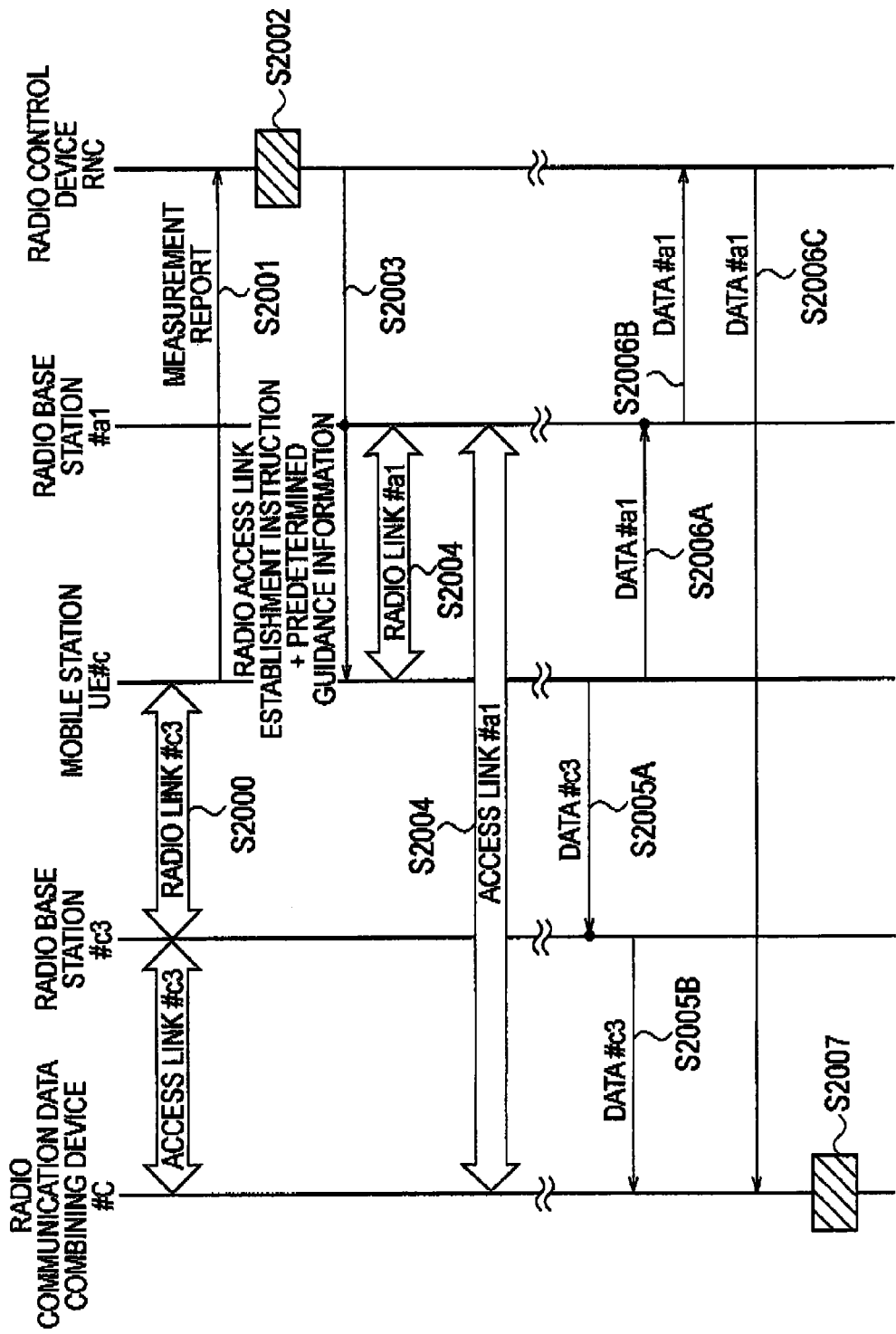
FIG. 5 is a sequence diagram showing the operations of the mobile communication system according to the first embodiment of the present invention.

Here, as shown in FIG. 5, the radio control device RNC may transmit the predetermined guidance information together with the radio access link establishment instruction in step S2003, and the radio base station #a1 for the "public area service" may notify the mobile station UE#c of the predetermined guidance information in radio access link establishment processing in step S2004.

In this case, either the radio control device RNC or the radio base station #a1 for the "public area service" may generate the charging information indicating that the radio access link #a1 (the radio link #a1 and the access link #a1) is established for complementing the "local area restricted service."

Secondly, an operation for allowing the radio base station #a2 for the "public area service" to complement the "local area restricted service" by the radio base station #b1 for the "local area restricted service" will be described with reference to FIG. 6 to FIG. 8.

Figure 6:
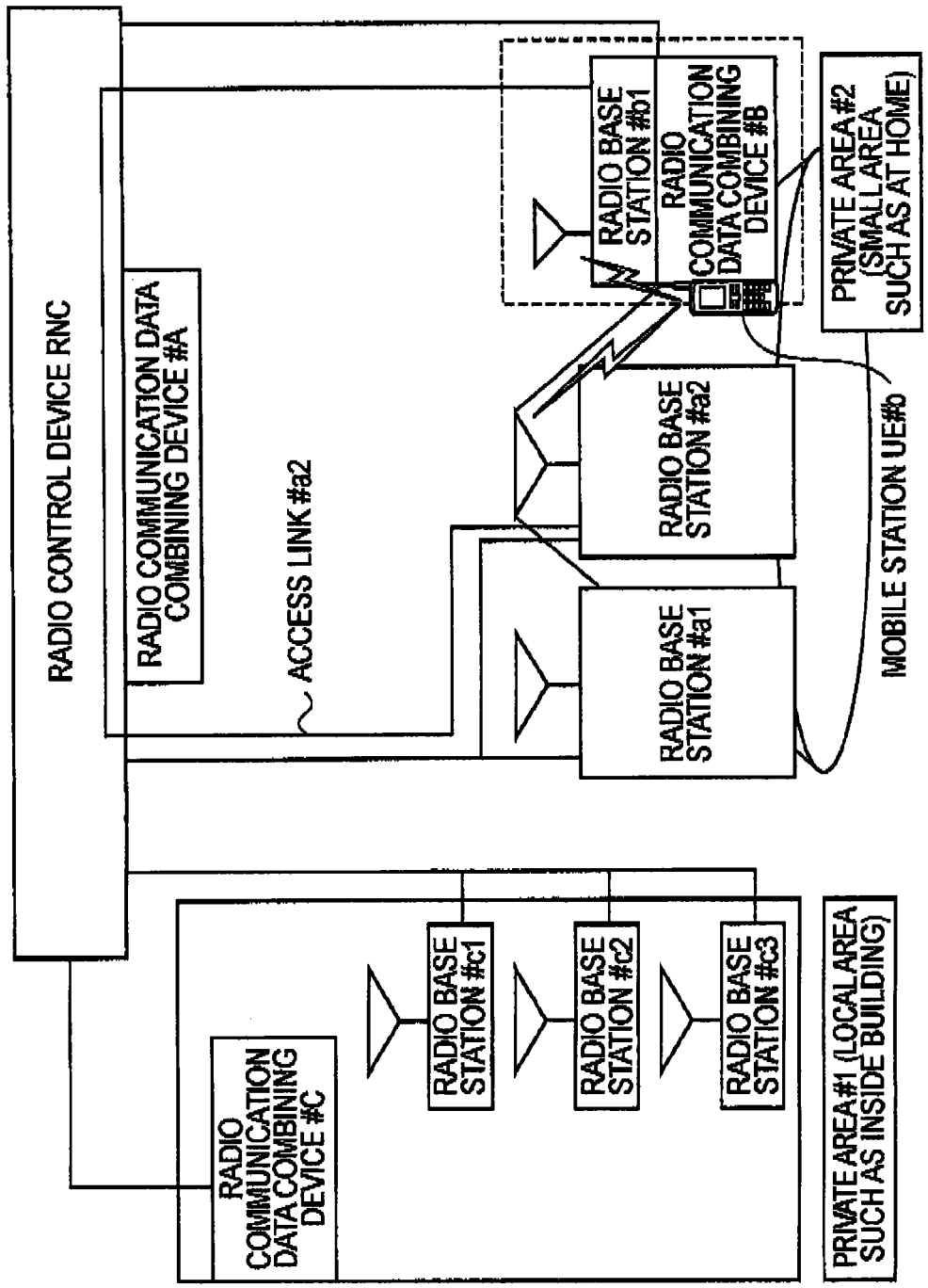
FIG. 6 is a view for explaining operations of the mobile communication system according to the first embodiment of the present invention.
Figure 7:
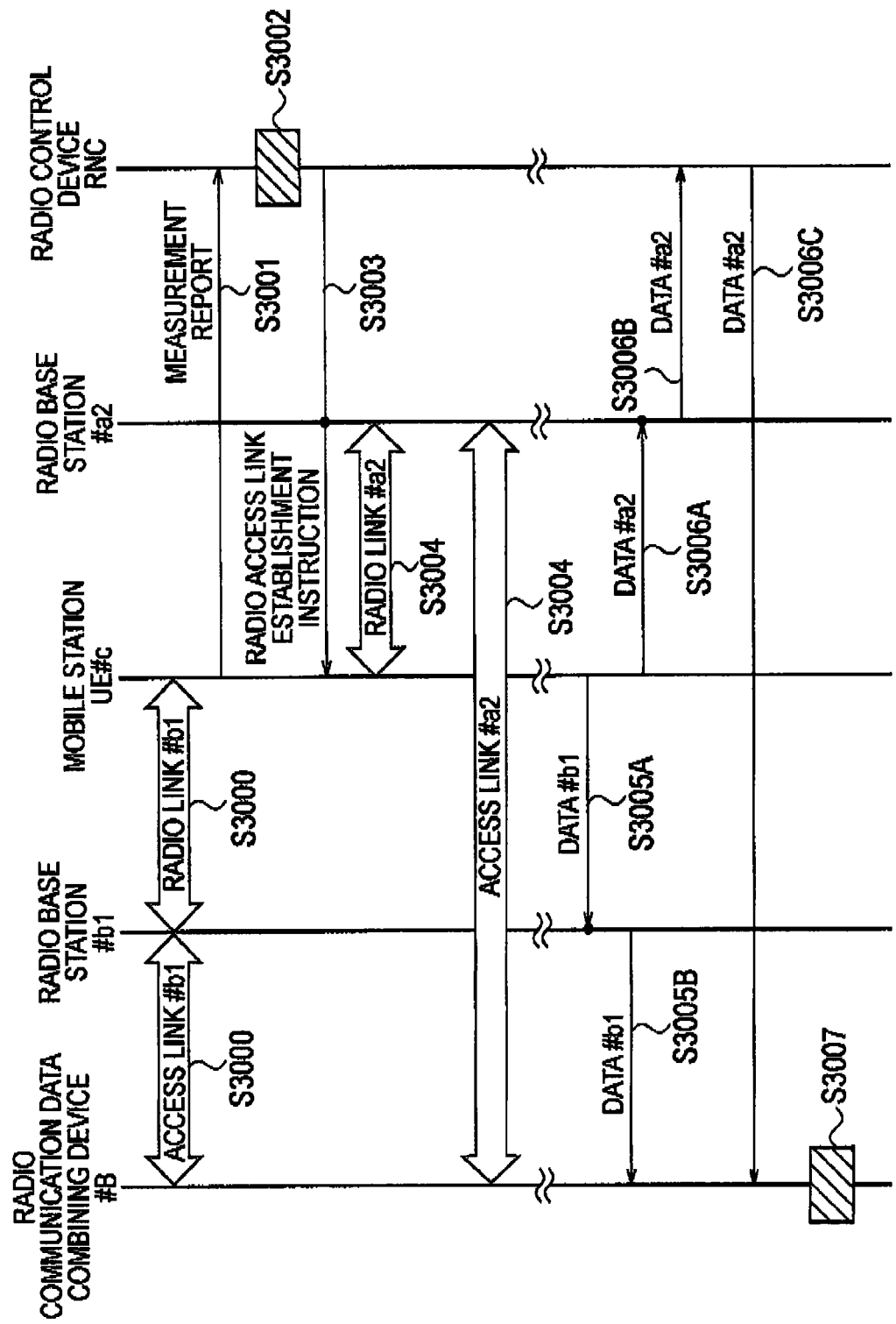
FIG. 7 is a sequence diagram showing the operations of the mobile communication system according to the first embodiment of the present invention.

As shown in FIG. 6 and FIG. 7, in step S3000, the radio link #b1 is assumed to be established between the mobile station UE#b and the radio base station #b1 for the "local area restricted service," the access link #b1 is assumed to be established between the radio base station #b1 for the "local area restricted service" and the radio communication data combining device #B for the "local area restricted service," and the radio access link #b1 is assumed to be established between the mobile station UE#b and the radio communication data combining device #B for the "local area restricted service."

Note that the radio base station #b1 for the "local area restricted service" is integrated with the radio communication data combining device #B for the "local area restricted service." Accordingly, the access link #b is the link located inside the device.

In step S3001, the mobile station UE#b transmits a measurement report (Measurement Report) indicating communication quality of a neighboring cell to the radio control device RNC via the radio access link #b1.

In step S3002, in response to the received measurement report, the radio control device RNC determines whether or not the "local area restricted service" by the radio base station #b1 for the "local area restricted service" needs to be complemented by radio base station #a2 for the "public area service" (that is, whether or not the mobile station UE#b needs to perform a soft handover between the radio base station #a2 for the "public area service" and the radio base station #b1 for the "local area restricted service."

Here, upon a determination that it is necessary to complement, the radio control device RNC determines whether or not the "local area restricted service" by the radio base station #c3 for the "local area restricted service" can be complemented by the radio base station #a2 for the "public area service."

Upon a determination that it is possible to complement, the radio base station RNC transmits a radio access link establishment instruction to the radio base station #a2 for the "public area service" and the mobile station UE#b in step S3003.

Here, the radio control device RNC may transmit the radio access link establishment instruction to the radio base station #a2 for the "public area service" and the mobile station UE#c without determining whether or not the "local area restricted service" by the radio base station #b1 for the "local area restricted service" can be complemented by the radio base station #a2 for the "public area service."

In this case, the determination as to whether or not the "local area restricted service" by the radio base station #b1 for the "local area restricted service" can be complemented by the radio base station #a2 for the "public area service" is made by the radio base station #a2 for the "public area service."

In step S3004, the radio link #a1 is established between the mobile station UE#b and the radio base station #a2 for the "public area service," the access link #a2 is established between the radio base station #a2 for the "public area service" and the radio communication data combining device #B for the "local area restricted service," and the radio access link #a2 is established between the mobile station UE#b and the radio communication data combining device #B for the "local area restricted service."

Thereafter, data #b1 for the "local area restricted service" are transmitted from the mobile station UE#b to the radio communication data combining device #B for the "local area restricted service" via the radio base station #b1 for the "local area restricted service" in steps S3005A and S3005B, and data #a2 for the "local area restricted service" having the same contents as the data #b1 for the "local area restricted service" are transmitted from the mobile station UE#b to the radio communication data combining device #B for the "local area restricted service" via the radio base station #a2 for the "public area service" and the radio control device RNC in steps S3006A to S3006C.

In step S3007, the radio communication data combining device #B for the "local area restricted service" combines the received data #b1 for the "local area restricted service" and the data #a2 for the "local area restricted service" together, and transmits the combined data for the "local area restricted service" to the Internet or a correspondent terminal.

Figure 8:
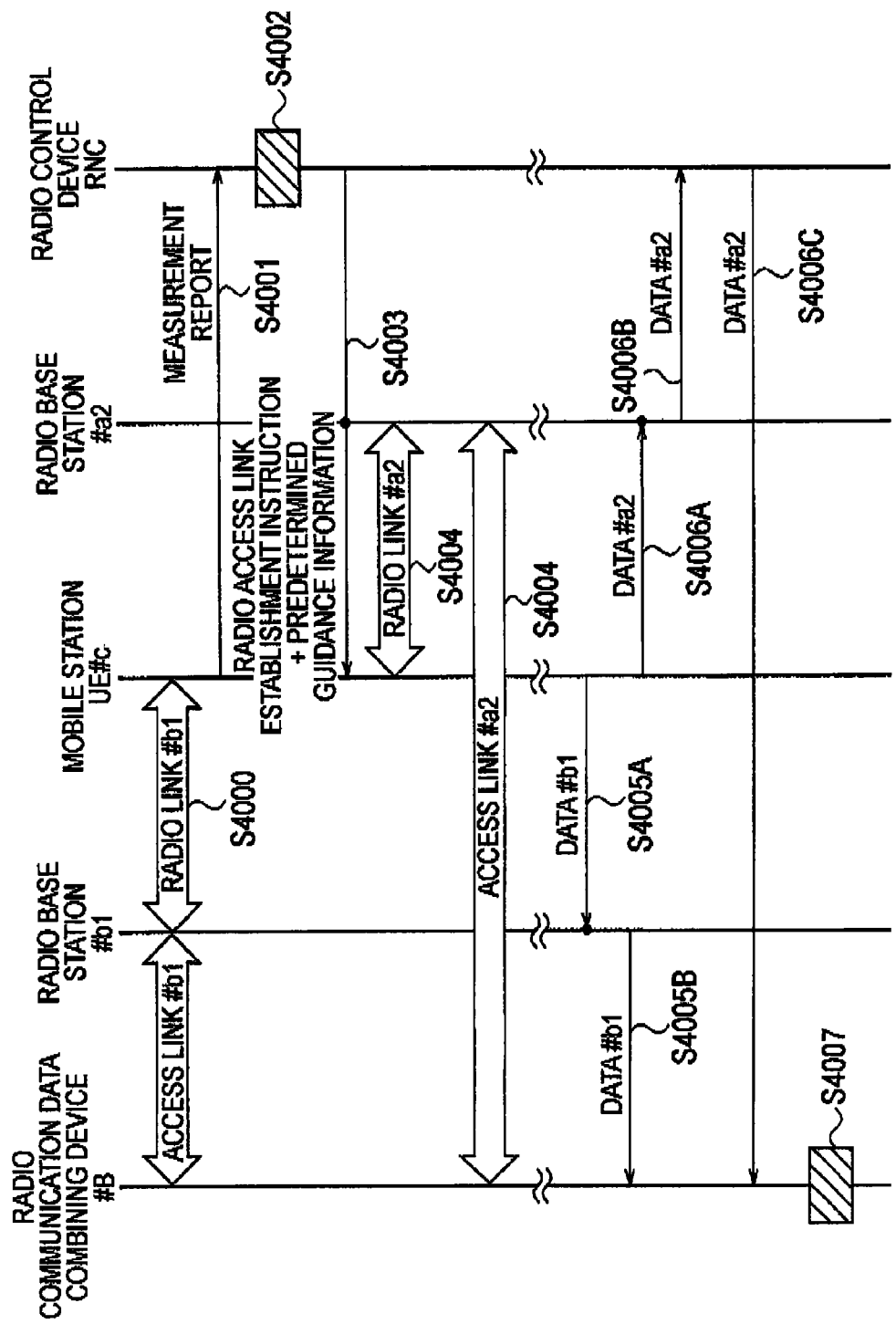
FIG. 8 is a sequence diagram showing the operations of the mobile communication system according to the first embodiment of the present invention.

Here, as shown in FIG. 8, the radio control device RNC may transmit the predetermined guidance information together with the radio access link establishment instruction in step S4003, and the radio base station #a2 for the "public area service" may notify the mobile station UE#b of the predetermined guidance information in radio access link establishment processing in step S4004.

In this case, either the radio control device RNC or the radio base station #a2 for the "public area service" may generate the charging information indicating that the radio access link #a2 (the radio link #a2 and the access link #a2) is established for complementing the "local area restricted service."

Advantageous Effect of Mobile Communication System According to First Embodiment of the Present Invention According to the mobile communication system of the first embodiment of the present invention, when the private area for providing the "local area restricted service" is formed near the public area or inside the public area, the radio base station #a2 for the "public area service" installed in the public area complements the "local area restricted service." In this way, it is possible to prevent deterioration in the communication quality of the "local area restricted service" even if the communication for the "public area service" has a significant effect in the private area (such as a boundary of an internal communication area).

Moreover, the mobile communication system according to the first embodiment of the present invention is configured to allow only the radio base station for the "public area service," for which the establishment permission information is managed, to complement the "local area restricted service." Therefore, it is possible to prevent a situation of unlimited expansion of the area for providing the "local area restricted service."

Further, according to the mobile communication system of the first embodiment of the present invention, even when the "local area restricted service" is provided as the flat-rate communication service, it is still possible to charge independently based on the charging information generated by the radio base station for the "public area service" or the radio control device RNC when the radio base station for the "public area service" is used for complementing the "local area restricted service."

FIRST MODIFIED EXAMPLE

A mobile communication system according to a first modified example of the present invention will be described with reference to FIG. 9 while focusing on differences from the above-mentioned mobile communication system according to the first embodiment.

Figure 9:
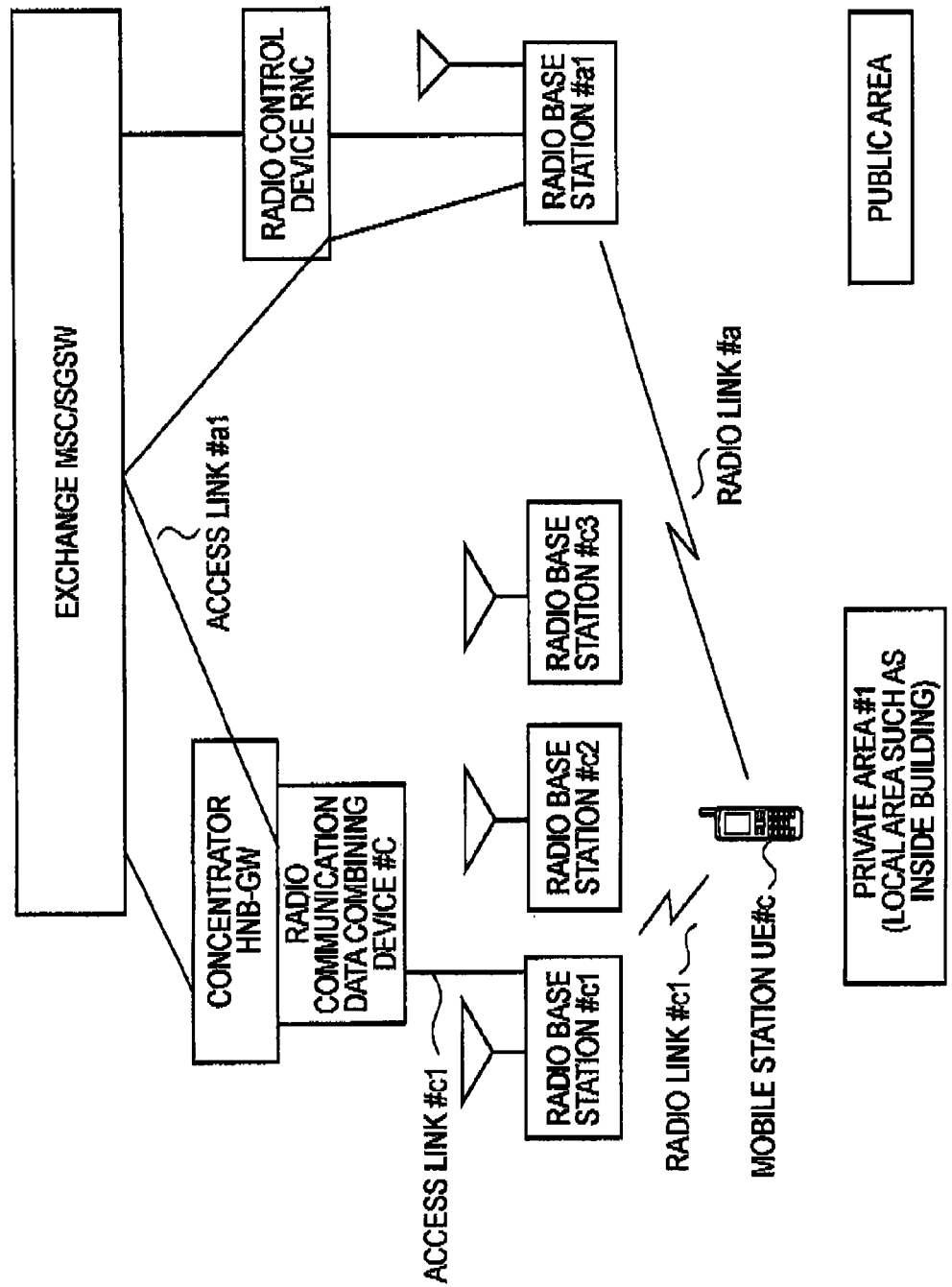
FIG. 9 is a view for explaining operations of a mobile communication system according to a first modified example of the present invention.

As shown in FIG. 9, when the radio access link #c1 (a first radio access link) is established between the radio communication data combining device #C (a first service radio communication data combining device) and the mobile station UE via the radio base station #c1 (a first service radio base station), the mobile communication system according to the first modified example of the present invention is configured to establish the radio access link #a1 (a second radio access link) between the radio communication data combining device #C (the first service radio communication data combining device) and the mobile station UE via the radio base station #a1 (a second service radio base station).

In this case, the radio base station #c1 (the first service radio base station) is configured to transfer the data #c1 for the "local area restricted service" (first service data) transmitted from the mobile station UE to the radio communication data combining device #C (the first service radio communication data combining device) via the radio access link #c1 (the first radio access link), while the radio base station #a1 (the second service radio base station) is configured to transfer the data #a1 for the "local area restricted service" (first service data) transmitted from the mobile station UE to the radio communication data combining device #C (the first service radio communication data combining device) via the radio access link #a1 (the second radio access link).

Here, the radio communication data combining device #C (the first service radio communication data combining device) is provided in a concentrator HNB-GW configured to concentrate the multiple radio base stations #c1 to #c3.

Note that each of the radio base stations #c1 to #c3 is a small radio station such as a Femto BTS or a HNB installed for defining the private area, while the radio base station #a1 is the radio base station for the "public area service.

Meanwhile, the radio access link #c1 includes the radio link #c1 and the access link #c1, while the radio access link #a1 includes the radio link #a1 and the access link #a1.

SECOND MODIFIED EXAMPLE

The above-described embodiment has been explained based on the mobile communication system of the W-CDMA mode as the example. However, the present invention is not limited only to this mobile communication system but is also applicable to a mobile communication system of the LTE (long term evolution) mode, for example.

In this case, the function of the above-described radio control device RNC is installed in a radio base station eNB or an exchange MME.

Specifically, a mobile communication system according to a second modified example of the present invention will be described with reference to FIG. 10 while focusing on differences from the above-described mobile communication system according to the first embodiment.

Figure 10:
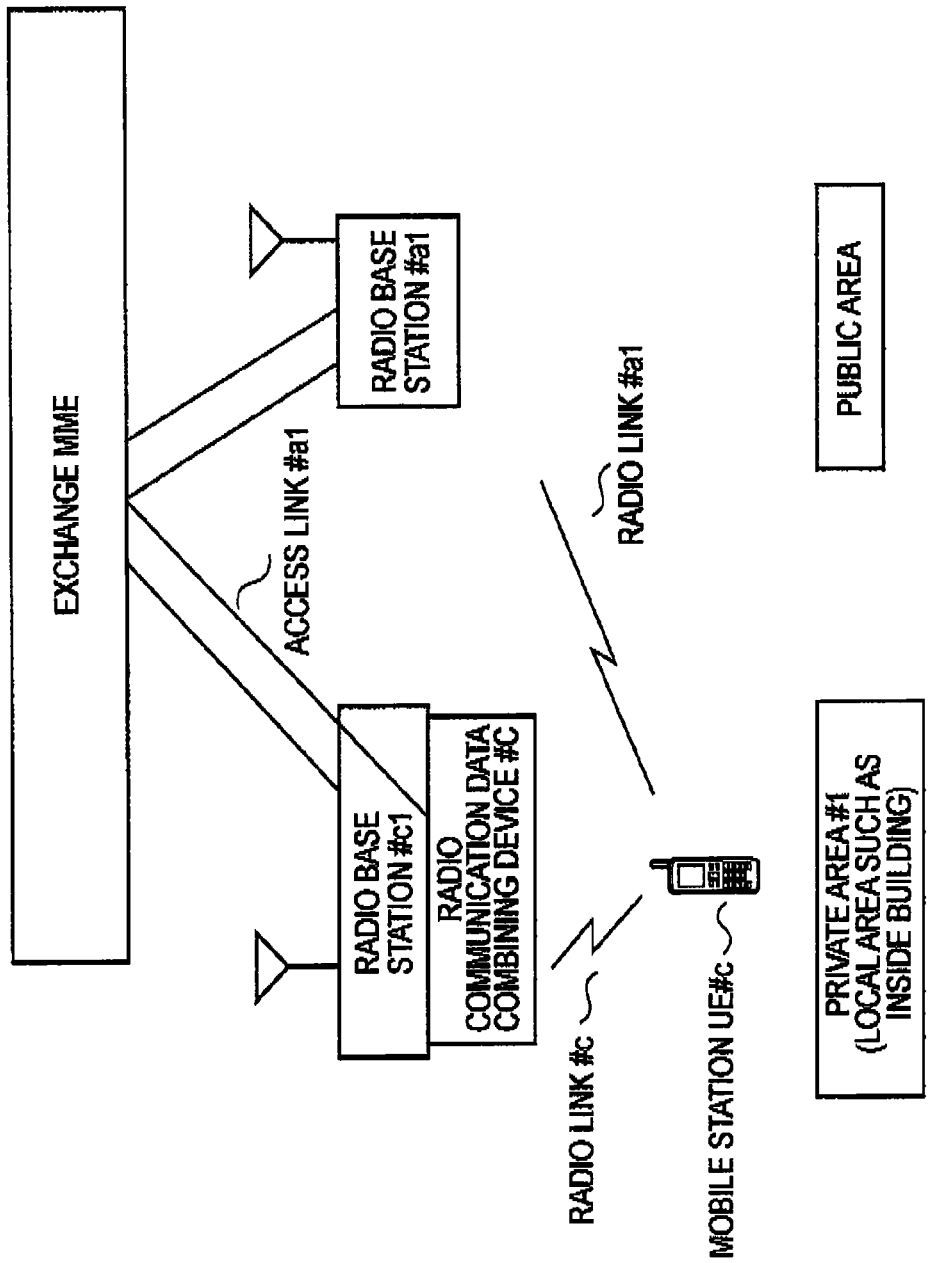
FIG. 10 is a view for explaining operations of a mobile communication system according to a second modified example of the present invention.
Figure 11:
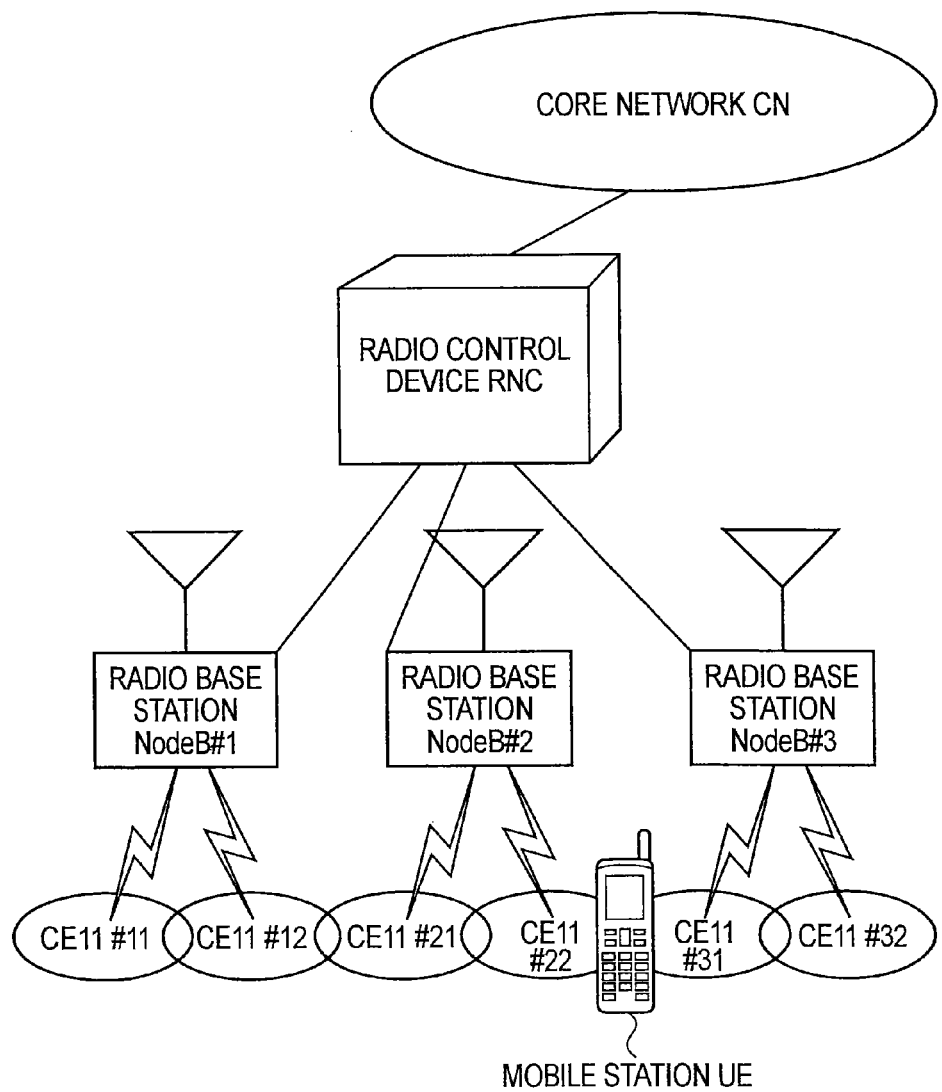
FIG. 11 is a view for explaining a conventional mobile communication system.
Figure 12:
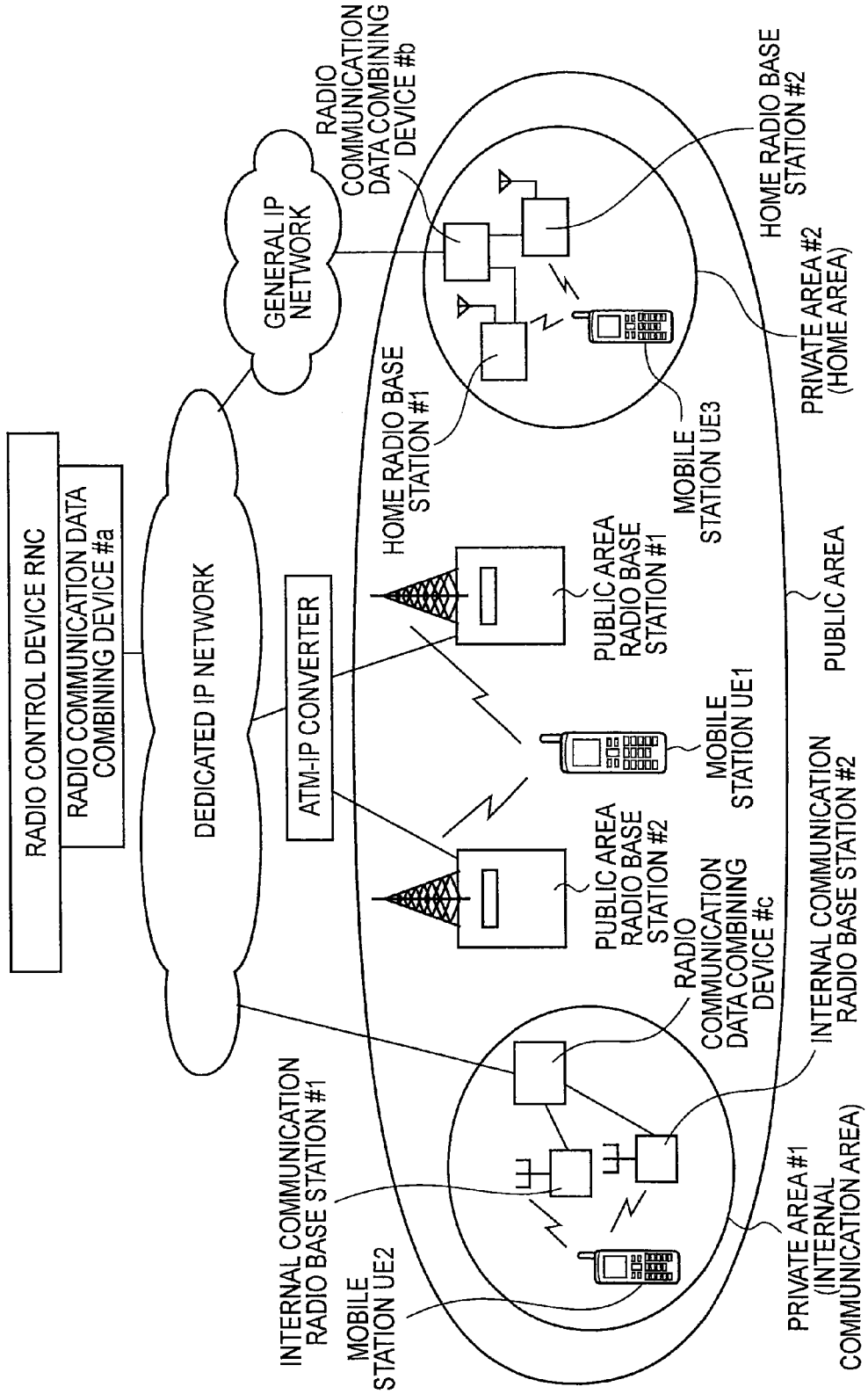
FIG. 12 is a view for explaining a conventional mobile communication system.

As shown in FIG. 10, when the radio access link #c1 (a first radio access link) is established between the radio communication data combining device #C (a first service radio communication data combining device) and the mobile station UE via the radio base station #c1 (a first service radio base station), the mobile communication system according to the first modified example of the present invention is configured to establish the radio access link #a1 (a second radio access link) between the radio communication data combining device #C (the first service radio communication data combining device) and the mobile station UE via the radio base station #a1 (a second service radio base station).

In this case, the radio base station #c1 (the first service radio base station) is configured to transfer the data #c1 for the "local area restricted service" (first service data) transmitted from the mobile station UE to the radio communication data combining device #C (the first service radio communication data combining device) via the radio access link #c1 (the first radio access link), while the radio base station #a1 (the second service radio base station) is configured to transfer the data #a1 for the "local area restricted service" (first service data) transmitted from the mobile station UE to the radio communication data combining device #C (the first service radio communication data combining device) via the radio access link #a1 (the second radio access link).

Here, the radio communication data combining device #C (the first service radio communication data combining device) is provided in the radio base station #c1.

Note that the radio base station #c1 is a small radio station such as a Femto BTS or a HeNB installed for defining the private area inside the radio access network of the LTE mode, while the radio base station #a1 is a radio base station eNB for the "public area service inside the radio access network of the LTE mode.

Meanwhile, the radio access link #c1 includes the radio link #c1 and the access link #c1, while the radio access link #a1 includes the radio link #a1 and the access link #a1.

Here, the radio base station #c1 is integrated with the radio communication data combining device #C. Accordingly, the access link #c1 is the link located inside the device.

Meanwhile, when the radio base station #c1 is concentrated on the concentrator HNB-GW in the mobile communication system according to the second modified example, the radio communication data combining device #C (the first service radio communication data combining device) may be provided in the concentrator HNB-GW.

Note that operation of the above described mobile station UE, the radio base station and the radio control device RNC may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the described mobile station UE, the radio base station and the radio control device RNC. Also, the storage medium and the processor may be provided in the described mobile station UE, the radio base station and the radio control device RNC as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising the steps of:
   establishing a second radio access link between a first service radio communication data combining device and a mobile station via a second service radio base station, when a first radio access link is established between the first service radio communication data combining device and the mobile station via a first service radio base station;
   transferring first service data transmitted from the mobile station, from the first service radio base station to the first service radio communication data combining device via the first radio access link;
   transferring the first service data transmitted from the mobile station, from the second service radio base station to the first service radio communication data combining device via the second radio access link;
   combining, at the first service radio communication data combining device, the first service data transferred from the first service radio base station and the first service data transferred from the second service radio base station; and
   managing establishment permission information indicating whether or not to permit establishment of the second radio access link at the second service radio base station,
   wherein the first service radio base station is configured to provide a local area restricted service and the second service radio base station is configured to provide a public area service,
   the method further including generating, by the second service radio base station, charging information indicating establishment of the second radio access link when the second radio access link is established.

2. The mobile communication method according to claim 1, further comprising the step of:

notifying the mobile station of predetermined guidance information when the first radio access link is established.

3. A radio base station configured to provide a public area service and to transmit and receive second service data, comprising:

a radio access link establishing unit configured to establish an access link with a first service radio communication data combining device and to establish a radio link with a mobile station, when a first radio access link is established between the first service radio communication data combining device and the mobile station via a first service radio base station;

a transferring unit configured to transfer first service data transmitted from the mobile station via the radio link, to the first service radio communication data combining device via the access link; and a managing unit configured to manage establishment permission information indicating whether or not to permit establishment of the radio link and the access link is managed by the radio base station, wherein the first service radio base station is configured to provide a local area restricted service, and wherein the radio base station is configured to generate charging information indicating establishment of the access link and the radio link when the access link and the radio link are established.

4. The radio base station according to claim 3, wherein the radio base station configured to notify the mobile station of predetermined guidance information when the first radio access link is established.

* * * * *